United States Patent [19]

Coppa

[11] 4,369,382
[45] Jan. 18, 1983

[54] LOW COST DIAGONAL TYPE MHD GENERAL CHANNEL FRAME ELEMENT AND METHOD OF FABRICATING THE SAME

[75] Inventor: Anthony P. Coppa, Merion, Pa.

[73] Assignee: General Electric Company, Schenectady, N.Y.

[21] Appl. No.: 267,437

[22] Filed: May 27, 1981

Related U.S. Application Data

[62] Division of Ser. No. 106,810, Dec. 26, 1979, Pat. No. 4,290,189.

[51] Int. Cl.³ .......................................... H02K 45/00
[52] U.S. Cl. ....................................................... 310/11
[58] Field of Search ........................................ 310/11

[56] References Cited

U.S. PATENT DOCUMENTS

| | | | |
|---|---|---|---|
| 3,149,247 | 9/1964 | Cobine et al. | 310/11 |
| 3,178,596 | 4/1965 | Brogan | 310/11 |
| 3,233,127 | 2/1966 | McKechnie | 310/11 |
| 3,242,354 | 3/1966 | Novack et al. | 310/11 |
| 3,280,349 | 10/1966 | Brenner et al. | 310/11 |
| 3,387,150 | 6/1968 | Powers, Jr. et al. | 310/11 |

*Primary Examiner*—Donovan F. Duggan
*Attorney, Agent, or Firm*—Robert C. Lampe, Jr.; H. H. Green, Jr.

[57] ABSTRACT

A diagonal type MHD generator channel frame element, having a polygonal configuration which is preferably rectangular, is formed from two different pairs of pre-formed hollow bars, one of the pairs serving as the electrode members, while the other pair serves as the electrode-interconnecting diagonal members. The electrode members have cross-sectional profiles corresponding to that of a parallelogram while the diagonal members have rectangular cross-sectional profiles. Preformed coolant passages are defined within the members in an entirely enclosed manner, and the cross-sectional profiles of the passages correspond to those of the members within which the passages are defined.

12 Claims, 5 Drawing Figures

LOW COST DIAGONAL TYPE MHD GENERAL CHANNEL FRAME ELEMENT AND METHOD OF FABRICATING THE SAME

This is a division of application Ser. No. 106,810, filed Dec. 26, 1979, now U.S. Pat. No. 4,290,189, issued Sept. 22, 1981.

FIELD OF THE INVENTION

The present invention relates generally to magnetohydrodynamic (MHD) generators, and more particularly to the window frame elements of a diagonal type MHD generator channel or duct, and a method of fabricating the same.

BACKGROUND OF THE INVENTION

A diagonally connected MHD generator channel or duct is one of the most preferred types of channels or ducts employed within MHD electric power generators due, for example, to the simplicity of the electrical connections between the generator electrodes and the external power system. A typical diagonal type MHD power generator channel or duct comprises an axially stacked assembly of a large number of individual, annular, rectangular forms or frame elements, commonly referred to as "window frames", which are electrically isolated or insulated from one another and cooled by means of a liquid passing through coolant channels operatively associated with each frame element. Exemplary diagonal type window frame MHD generators are disclosed within U.S. Pat. Nos. 3,940,640, 3,940,639, and 3,148,291, it being noted that the coolant channels are not disclosed.

Construction of diagonal type MHD generators is rendered difficult in view of the fact that the planes of the frame elements are inclined relative to the generator channel's longitudinal axis, as indicated within the aforenoted patents by the angle $\theta$, wherein $\theta$ is less than 90° and is commonly 45°. This difficulty is enhanced further by the fact that the angle of inclination of the frame elements varies within the end regions of the channel in order to accommodate the varying inclination of the equipotential lines that characterize these channel end regions. This requisite inter-frame angular variation is resolved by costly and complex means, such as, for example, the fabrication of window frame elements exhibiting tapered thickness dimensions as viewed along their diagonal components. Additional fabrication difficulties are also presented in view of the fact that internal coolant passages must be defined throughout the entire annular extent of the frame elements.

The aforenoted features of diagonal type MHD generator channels thus render the fabrication thereof quite costly, as will become even more apparent hereinbelow, particularly when adherence to predetermined quality control standards is to be achieved. For example, as can readily be seen from the foregoing discussion, the generator duct or channel must meet particular geometrical requirements, as must the contour characteristics of the coolant passages. Dimensional consistency is likewise required to be maintained in connection with the inter-frame mating surfaces, and the assembled integrity of the generator channel must be assured in order to maintain the fixed disposition of the frame element insulators, the overall structural stability of the channel, and the satisfactory performance of the cooling system.

In the fabrication of conventional diagonal type MHD generator channel frames, there exist basically two different methods of construction. In accordance with a first method of constructing such frames, the same are machined from solid plate material. The ability to precisely control the machining processes facilitates the accurate production of geometrically complex structures with a high degree of manufacturing predictability and reliability, and thus, this method is particularly useful for channel frame construction, especially in connection with the fabrication of the end frame elements having variable plate thicknesses. The method, however, involves substantial fabrication expenditures, and is severely limited in connection with the production of particularly contoured coolant passages within the frame elements. In accordance with this method, for example, a continuous groove must be machined throughout the entire annular extent of each frame element either within an edge or side surface thereof, not unlike that shown, for example, within U.S. Pat. No. 3,374,368, although it is seen that the frame element of such patent is not fabricated from a single component of plate stock. Nevertheless, whether the entire frame is to be fabricated from a single component of plate stock, or from individual frame members joined together, the machining processes required for forming the coolant grooves or passages necessitate the removal of substantial amounts of the plate material. In addition, as can readily be appreciated from U.S. Pat. No. 3,374,368, particularly FIGS. 9 and 10 thereof, in view of the fact that the coolant passage is machined within one surface of the plate and is thus closed upon three sides thereof yet open along one side thereof, that is, the machined side, in order to define a completely enclosed coolant passage, specially designed cover plates or caps are required. Such components of course involve additional material expenditures and assembly time. The cap members or cover plates are conventionally welded to the frame elements, and additional machining is often required within the weld regions subsequent to the completion of the welding operations. While this first method would be substantially simplified if a circular, rather than a particularly contoured, coolant passage profile was defined within the frame elements, since such profiles could simply be generated by conventional gun-drilling techniques, circular coolant passages have been unacceptable in that the same do not exhibit satisfactory heat transfer or heat exchange properties, especially in connection with the MHD electrodes.

The second conventional method of constructing diagonal type MHD generator channel frames is achieved by bending either a straight solid bar, a straight open-sided bar of the type discussed hereinabove in connection with U.S. Pat. No. 3,374,368, or a straight hollow bar, into the required framework element and welding the ends together so as to form the annular component. In accordance with this method, wherein the bar stock has, for example, a rectangular cross-sectional profile, machining of the channel or duct bore is of course entirely obviated as the bar is bent so as to conform to the appropriately required bore geometry and dimensions as determined by the inner periphery of the bar annulus. However, as the frame element is to be disposed within a diagonal plane, the electrode portions of the frame element must necessarily have a cross-sectional profile corresponding to that of a parallelogram. Consequently, a considerable amount of bar stock material must be removed by machining processing from the interior or bore and exterior regions of the frame electrode portions subsequent to the welding together of the bar ends. In addition, an extensive amount of material must also be removed from the bar stock in order to provide or define the coolant passages as in the case of machining the frame elements from plate stock.

When open-sided bar stock, having, for example, a rectangular cross-sectional profile, is utilized in accordance with this second method, the machining processing required for defining the coolant passages within the diagonal portions of the frame elements is of course eliminated, however, as noted in conjunction with the structures of U.S. Pat. No. 3,374,368, cover plates or cap members will be required. In addition, machining of the electrode portions of the frame elements will be required in order to convert the cross-sectional profile thereof to that of a parallelogram. Similarly, some machining will likewise be required in order to convert the coolant passage profile within the electrode portions of the elements from that of a rectangle to that of a parallelogram such that the contours of the coolant passages match those of the electrode frame portions per se.

Lastly, if hollow bar stock, having, for example, an exterior rectangular cross-sectional profile and an interior bore having, for example, a cross-sectional profile simulating a parallelogram, were utilized for forming the frame elements of the MHD generator channel, similar machining and unacceptable standards problems would likewise be presented. The electrode portions of the frame elements would have to be machined as in the previous two instances of solid and open-sided bar stock in order to convert the rectangular bar stock into parallelogram-profiled stock, however, it would be noted that the diagonal members of the frame elements, which have an exterior rectangular cross-sectional profile, have contoured coolant passages the cross-sectional profiles of which are those of parallelograms. Since these profiles do not match those of the bar stock per se, unacceptably poor heat transfer or heat exchange properties would characterize these frame element members.

OBJECTS OF THE INVENTION

Accordingly, it is an object of the present invention to provide a new and improved diagonal type MHD channel frame element and a method of fabricating the same.

Another object of the present invention is to provide a new and improved diagonal type MHD channel frame element and a method of fabricating the same wherein the disadvantages of prior art frame elements and their methods of fabrication will be overcome.

Still another object of the present invention is to provide a new and improved diagonal type MHD channel frame element and a method of fabricating the same wherein substantial machining processing is eliminated.

Yet another object of the present invention is to provide a new and improved diagonal type MHD channel frame element and a method of fabricating the same wherein the fabrication costs thereof are drastically reduced.

Yet still another object of the present invention is to provide a new and improved diagonal type MHD channel frame element and a method of fabricating the same wherein frame elements to be utilized within the central portion of the generator channel, as well as those transitional frame elements to be utilized within the end regions of the channel, may be fabricated.

Still yet another object of the present invention is to provide a new and improved diagonal type MHD channel frame element and a method of fabricating the same wherein quality hardware, meeting requisite quality control standards, may be produced.

A further object of the present invention is to provide a new and improved diagonal type MHD channel frame element and a method of fabricating the same wherein substantially less stock material is required to be utilized in the fabrication process than that required in accordance with some other conventional methods whereby fabrication costs are reduced still further as compared to those of conventional fabrication processes.

SUMMARY OF THE INVENTION

The foregoing and other objects are achieved in accordance with the present invention through the provision of a diagonal type MHD generator channel frame element which comprises a polygonal configuration which is substantially rectangular and which is formed from two different pairs of pre-shaped or pre-formed hollow bars. Identical components of each pair are oppositely disposed within the framework and serve as the electrode members and the electrode interconnecting diagonal members. The electrode members comprise bar stock having a cross-sectional profile simulating a parallelogram, while the diagonal members have a rectangular cross-sectional profile. The components may be extruded or cast, and pre-formed coolant passages, entirely enclosed within the component bodies, are defined to have the same contours as those of the component bodies within which they are defined. In this manner, the coolant passages are located within the regions of the component bodies, and have the requisite contours relative to the configurations of the frame component bodies per se, so as to maximize the heat transfer or heat exchange operative characteristics of the coolant system. As the frame components are all pre-formed to predetermined size specifications, the resulting frame element corresponds to requisite size and geometrical characteristics, both externally for being accommodated within the generator housing, and internally for defining the particular generator channel or duct. In addition, as all of the coolant passages are pre-formed in an entirely enclosed manner within the frame components, auxiliary cover plates or cap hardware are obviated.

BRIEF DESCRIPTION OF THE DRAWINGS

Various other objects, features, and attendant advantages of the present invention will be more fully appreciated as the same becomes better understood from the following detailed description when considered in connection with the accompanying drawings, in which like reference characters designate like or corresponding parts throughout the several views, and wherein.

DETAILED DESCRIPTION OF THE PREFERRED EMBODIMENT

Figure 1:
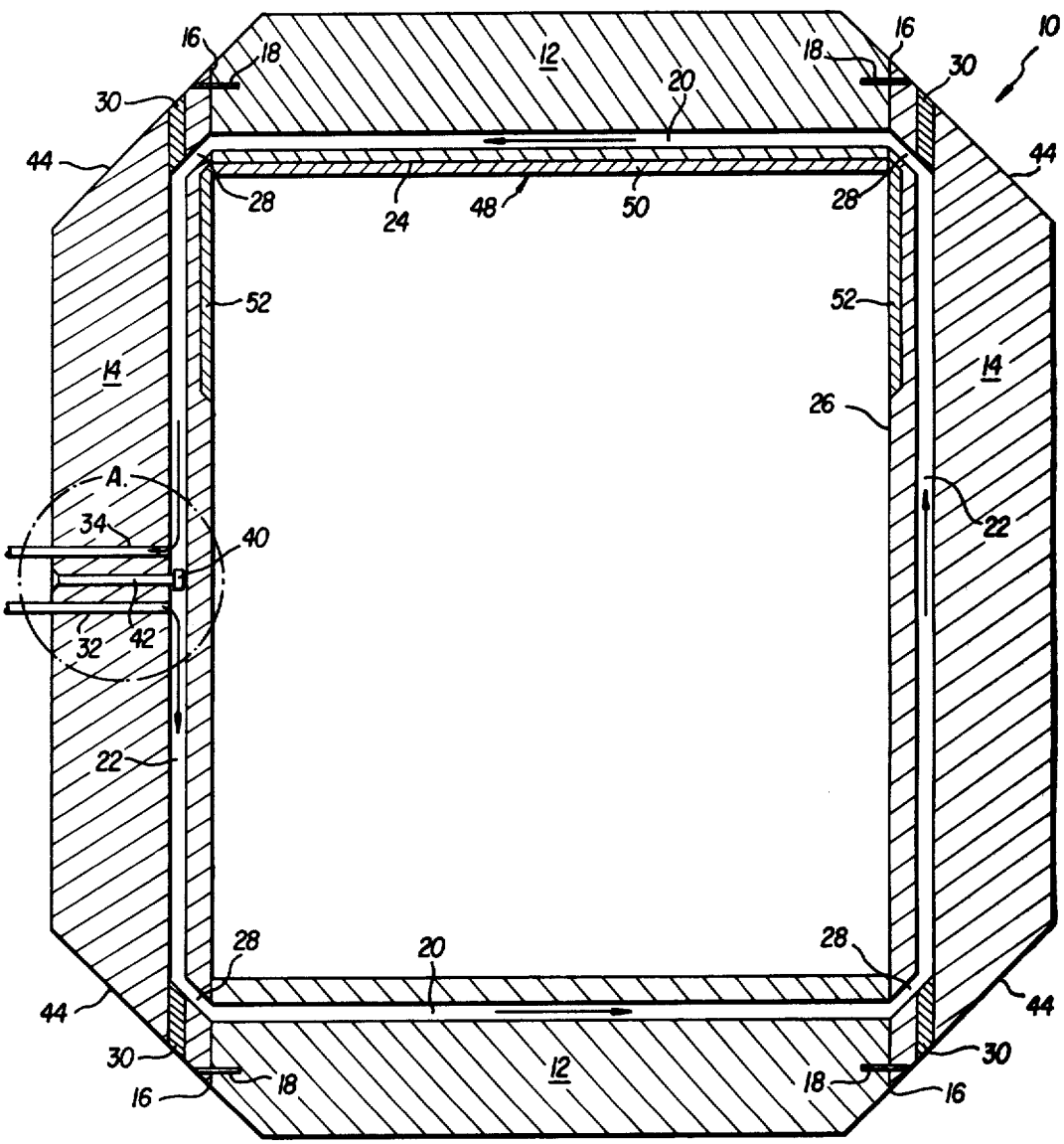
FIG. 1 is a projected cross-sectional view of a frame element constructed in accordance with the present invention and showing its cooperative parts.

Referring now to the drawings, and more particularly to FIG. 1 thereof, there is shown a diagonal type MHD generator channel frame element constructed in accordance with the present invention and generally designated by the reference character 10. The frame element is seen to comprise two different pairs of pre-formed hollow bars, with the component bars of each pair being substantially identical. The bars may be formed of extruded or cast copper, and one pair 12, 12 thereof will serve as the electrode members of the frame element 10, while the other pair 14, 14 of bars serves as the electrode-interconnecting diagonal members. The electrode and diagonal members are adapted to be brazed or welded together within the corner joint regions 16 thereof, and dowel pins 18 are provided at the cornerjoint sites for reinforcing the same.

Figure 2:
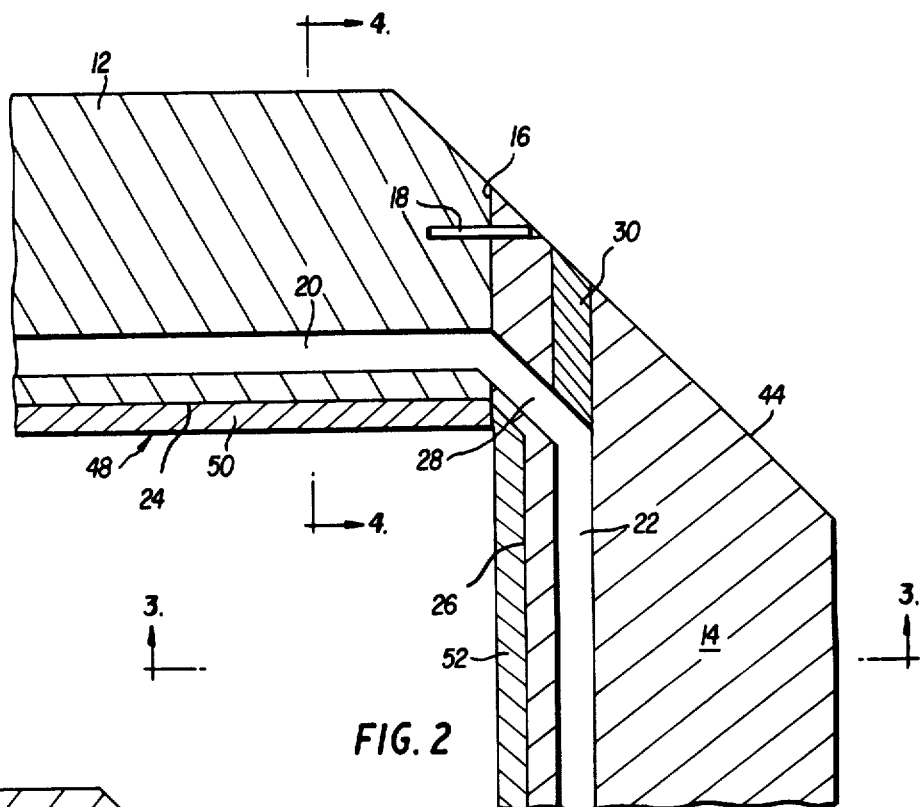
FIG. 2 is an enlarged detail view of a corner junction of the frame element of FIG. 1.
Figure 4:
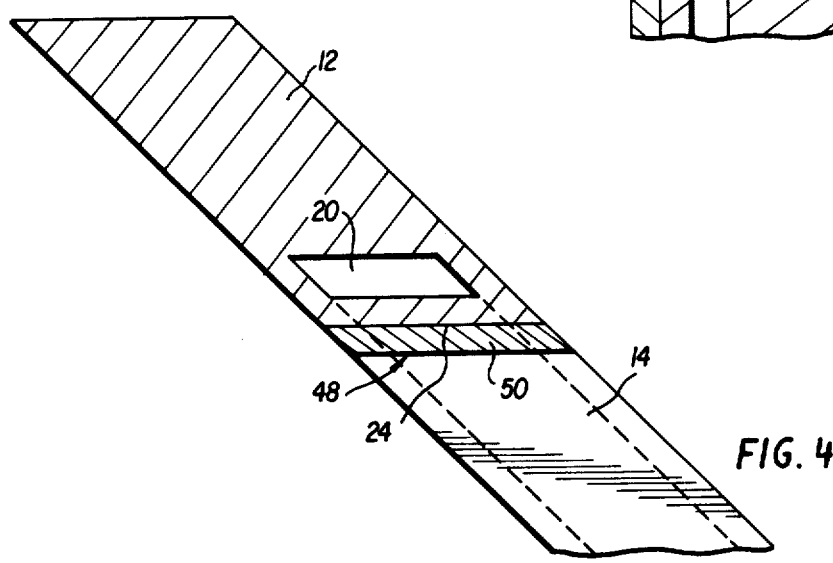
FIG. 4 is a cross-sectional view of the frame element portion of FIG. 2 taken along line 4—4 of FIG. 2.
Figure 3:
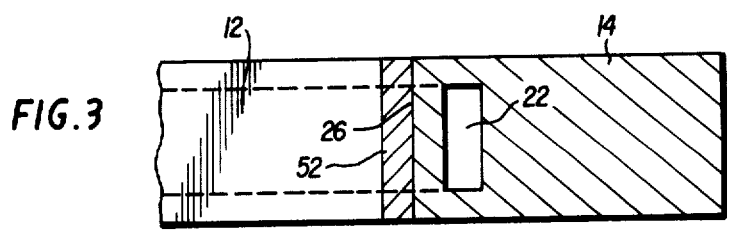
FIG. 3 is a cross-sectional view of the frame element portion of FIG. 2 taken along line 3—3 of FIG. 2.

As evidenced by FIGS. 2–4, the electrode members 12 have an exterior cross-sectional profile corresponding to that of a parallelogram, while the diagonal members 14 have a rectangular exterior cross-sectional profile. Thus, when the electrode and diagonal members are joined together, a diagonal frame element is achieved. In order to provide cooling for the frame elements axially stacked along the generator channel, each of the electrode and diagonal members of each frame element is provided with a coolant passage 20 and 22, respectively. As can best be appreciated from FIGS. 2–4, the coolant passages are defined within the vicinity of the interior edges or surfaces 24 and 26, respectively, of the electrode and diagonal members, and it is further seen that the cross-sectional profiles of the coolant passages correspond to the cross-sectional profiles of the electrode and diagonal members within which the coolant passages are defined. More specifically, as seen in FIG. 3, the diagonal frame member 14 has a rectangular cross-sectional configuration, and the cross-sectional configuration of coolant passage 22 is likewise rectangular. Similarly, as seen from FIG. 4, the cross-sectional configuration of electrode frame member 12 corresponds to that of a parallelogram, and the cross-sectional configuration of coolant passage 20 is likewise that of a parallelogram. In this manner, heat transfer or heat exchange properties of the frame element are maximized and cooling efficiency thereof is requisitely high as to insure good and long service life characteristics.

As a result of the pre-forming or pre-shaping extrusion or casting of the bar members 12 and 14, it is further appreciated that the coolant passages 20 and 22 are defined within the members 12 and 14 in an entirely enclosed mode. In this manner, auxiliary cover plates or cap members are not required in order to complete the definition of the coolant passages within the frame members. It is noted, however, that in order to provide a completely enclosed circulatory coolant system throughout the entire peripheral or annular extent of the frame element 10, there must be provided transitional coolant passages 28 within the end regions of each diagonal member 14. The transitional passages 28 are defined, for example, by means of a boring or milling process, and are seen to be disposed at an angle to the longitudinal axis of each member 14, the angle being, for example, 45°. Upon mating together of the diagonal and electrode members 14 and 12, respectively, the transitional passages, which are defined within diagonal members 14 so as to fluidically interconnect with coolant passages 22, will likewise fluidically interconnect with coolant passages 20 defined within electrode members 12. In order to prevent the escape of the coolant fluid from the ends of the coolant passages 22 defined within diagonal members 14, suitable plug members 30 are appropriately fixed within the outermost end regions of the passages 22.

In conjunction with the circulatory coolant system defined by passages 20, 22, and 28, one of the diagonal members 14 is provided with two transversely extending bores 32 and 34 within the central region thereof. A pair of stainless steel coolant tubes 36 and 38 are respectively disposed within the bores, and the tubes 36 and 38 are connected to means, not shown, for circulating the coolant fluid throughout the coolant passage network defined within the frame element 10. In particular, coolant fluid enters coolant inlet tube 36, flows through the coolant passage network defined by passages 20, 22, and 28 within the element 10, and is conducted out of the element through means of outlet coolant tube 38.

In order to facilitate the proper directional circulation of the coolant throughout the element 10, and to insure that the flow is substantially laminar and not turbulent, particularly within the vicinity of the inlet and outlet tubes 36 and 38, a flow divider 40 is disposed within the coolant passage 22 of the diagonal member 14 at a location intermediate the fluid connections between tubes 36 and 38 and passage 22. In this manner, as the coolant fluid enters passage 22 from inlet tube 36, flow divider 40 substantially blocks that portion of passage 22 disposed above inlet tube 36 so as to prevent the fluid from flowing upwardly within passage 22 as viewed in FIGS. 1 and 5, and will therefore simultaneously cause the fluid to flow downwardly within passage 22. It will be additionally noted from FIG. 5 that the lateral dimensions of flow divider 40 are such as to be somewhat slightly less than those of passage 22, and consequently, some fluid coolant is able to by-pass the divider 40 from the region within the vicinity of outlet tube 38 toward the region within the vicinity of inlet tube 36. In this manner, the portion of diagonal member 14 which is defined between the inlet and outlet tubes 36 and 38 is nevertheless able to be cooled. Of course, the vastly greater portion of the coolant fluid approaching the junction of outlet tube 38 and passage 22 will be exhausted out of element 10 through means of outlet tube 38.

Figure 5:
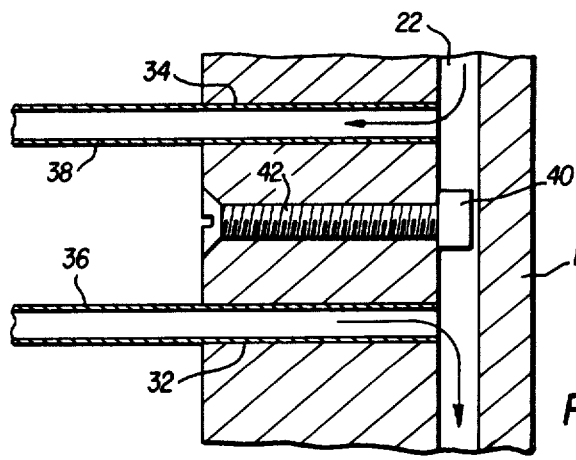
FIG. 5 is an enlarged detail view of the frame element portion encompassed within circle A of FIG. 1.

Since the dimensions of divider are slightly less than those of passage 22 for the aforenoted reasons, means must be provided in order to fixedly secure divider within the passage 22. Otherwise, the divider would freely float within the passage 22 and would probably ultimately block circulation of the coolant fluid throughout element 10 as a result of blocking, for example, the junction of passages 22 and 28. The aforenoted securing means may take the form of a set screw 42 which is transversely mounted within diagonal member 14 at a position interposed between the inlet and outlet tubes 36 and 38. The inner end of the screw is of course secured to divider 40, as best seen in FIG. 5, and in this manner, divider 40 is prevented from movement within passage 22.

As will readily be appreciated from the foregoing, the fabrication of the MHD channel frame elements from two different pairs of pre-formed members substantially eliminates all major machining processes conventionally required in connection with prior art MHD channel frameworks. This is particularly the case with respect to the generator channel bore as well as the exterior geometrical considerations. More importantly, machining is obviated in connection with the provision of the rectangularly configured diagonal members, and their rectangularly configured internal coolant passages, as well as the parallelogram-configured electrode members and their similarly configured internal coolant passages. In addition, only the requisite amount of stock material required for fabricating the individual frame element components or members is required due to the fact that such members are preformed in configuration and size. Machining operations for converting the members from rectangular to parallelogram-configurations have been obviated.

While the frame element 10 of the present invention may have a generally annular polygonal configuration comprising any number of elements defining side, end, or corner regions, the common configuration for such MHD generator channels is rectangular, and therefore, the frame of the present invention comprises four components or members brazed or welded together. As a result of the pre-forming processes of extrusion or casting, the components or members may of course be fabricated in a variety of different sizes or shapes. In this manner, assembling of the components or members together can be easily achieved in accordance with particular MHD generator channel requirements. With respect to the considerations of whether or not the frame element components or members are in fact extruded or cast, for example, various criteria are to be considered. For example, frame elements that are to be utilized within the central regions of the generator channel, and therefore have constant cross-sections and thicknesses with respect to all of their electrode and diagonal members, may be extruded. Tapered diagonal members cannot of course be fabricated by means of extrusion processes, and consequently, such tapered members, for use within the end regions of the duct or channel, would have to be cast. Similarly for those frame element members which are too large to be extruded, the same would have to be cast.

In connection with the assembly of the frame element of the present invention and the accommodation of the same within the MHD generator housing, not shown, it is in some instances common to house the frame elements and resulting channel within a substantially octagonal housing, and consequently, as seen from FIG. 1, a simple cutting or sawing procedure may be utilized in conjunction with the four-sided rectangular frame element of the present invention in order to convert the same to a substantially eight-sided octagonal frame element for disposition within the octagonal generator housing. In accordance with such procedure, the corner regions 44 of the frame element 10 may be appropriately chamfered or cut. Lastly, it is also noted per the particular disclosure of the present invention that the anode 48 of each frame element 10 is seen to comprise three elements, as best seen in FIG. 1. The central section 50 covers the entire bore surface of the upper electrode frame member 12, while side sections 52 cover approximately twenty percent (20%) of the length of the diagonal members 14 as measured from the corner junctions of the diagonal members 14 and the electrode members 12.

Obviously, many modifications and variations of the present invention are possible in light of the above teachings. It is therefore to be understood that within the scope of the appended claims, the present invention may be practiced otherwise than as specifically described herein.

What is claimed as new and desired to be secured by Letters Patent of the United States is:

1. A diagonal type MHD generator channel frame element comprising:
   a first set of members each of which has a first exterior cross-sectional profile, and an internal passageway totally enclosed within the body of said first member and having a first cross-sectional profile similar to said exterior cross-sectional profile of said first member;
   a second set of members each of which has a second exterior cross-sectional profile, and an internal passageway totally enclosed within the body of said second member and having a second cross-sectional profile similar to said exterior cross-sectional profile of said second member;
   said first and second members being connected together in an annular array so as to define said frame element, with members of each set disposed in opposite pairs;
   means for fluidically connecting together said passageways defined within said first and second members such that a single fluid passageway extends annularly throughout said annular frame element; and
   means for circulating coolant fluid within said single passageway and throughout said annular frame element.

2. A frame element as set forth in claim 1, wherein: said first and second members are bar extrusions having extruded passageways.

3. A frame element as set forth in claim 1, wherein: said first and second members are cast bars having cast passageways.

4. A frame element as set forth in claim 1, wherein: said first set of members comprise the electrodes of said MHD generator; and
said first cross-sectional profile is that of a parallelogram.

5. A frame element as set forth in claim 4, wherein: said second set of members comprise electrode-interconnecting diagonal members of said MHD generator; and
said second cross-sectional profile is that of a rectangle.

6. A frame element as set forth in claim 1, wherein: each of said sets of members comprises two members; and
said annular frame element is substantially rectangular.

7. A frame element as set forth in claim 1, wherein: said passageways defined within said first and second members extend parallel to the longitudinal axes of said first and second members; and
said means for fluidically connecting together said passageways defined within said first and second members comprises additional passageways defined along directions oriented in a predetermined angular mode with respect to the longitudinal axes of said first and second members.

8. A frame element as set forth in claim 1 wherein said means for circulating coolant fluid within said single passageway, comprises:
   coolant inlet and outlet tubes fluidically connected to said single passageway; and flow divider means disposed within said single passageway for causing said coolant fluid to flow in substantially one direction from said inlet tube into said single passageway and out of said outlet tube.

9. A frame element as set forth in claim 1, further comprising:
   means for reinforcing the joint connections defined between said first and second members.

10. A frame element as set forth in claim 9, wherein: said joint reinforcing means comprises dowel pins.

11. A frame element as set forth in claim 8, wherein: the dimensions of said flow divider are less than those of said single passageway,
   whereby some of said coolant fluid is able to bypass said flow divider.

12. A frame element as set forth in claim 11, wherein: said flow divider is maintained within said single passageway by means of a set screw attached to said flow divider and mounted within said frame element.

* * * * *